United States Patent [19]

Parikh

[11] Patent Number: 5,432,917
[45] Date of Patent: Jul. 11, 1995

[54] TABULATION OF MULTI-BIT VECTOR HISTORY

[75] Inventor: Shrikant N. Parikh, Mesquite, Tex.

[73] Assignee: International Business Machines Corporation, Armonk, N.Y.

[21] Appl. No.: 872,221

[22] Filed: Apr. 22, 1992

[51] Int. Cl.⁶ .................... G06F 12/08; G06F 12/06
[52] U.S. Cl. ................................ 395/400; 395/425; 364/DIG. 1
[58] Field of Search ........................ 395/425, 250; 364/DIG. 1

[56] References Cited

U.S. PATENT DOCUMENTS

| | | | |
|---|---|---|---|
| 4,035,778 | 7/1977 | Ghanem | 395/650 |
| 4,463,424 | 7/1984 | Mattson et al. | 395/425 |
| 4,597,041 | 6/1986 | Guyer et al. | 395/375 |
| 4,774,659 | 9/1988 | Smith et al. | 395/400 |
| 4,926,322 | 5/1990 | Stimac et al. | 395/500 |
| 4,967,353 | 10/1990 | Brenner et al. | 395/425 |
| 5,063,499 | 11/1991 | Garber | 395/500 |
| 5,237,661 | 8/1993 | Kawamura et al. | 395/250 |
| 5,297,265 | 3/1994 | Frank et al. | 395/400 |

OTHER PUBLICATIONS

Bowater, R. J. Synchronous Co-Processor Support in a Virtual Memory System. Nov. 1990. TDB pp. 358-360.
Disbrow, J. R. One Pass Page Replacement Algorithm. May 1971, TDB pp. 3877-3878.
Rasmussen, E. C. A Self Correcting Segment Aging Frequency Heuristic. Aug. 1991, Reasearch Disclosure n328.

*Primary Examiner*—David L. Robertson
*Assistant Examiner*—Sheela N. Nadig
*Attorney, Agent, or Firm*—A. Bruce Clay

[57] ABSTRACT

A multi-bit SP-Vector is created to record the history of each page of a process. Each time an ager scans the accessed/not accessed bit flag of the page tables entires, the SP-Vector is updated to reflect whether or not the corresponding page was accessed. A table is created to provide ready update and interpretation information for each SP-Vector depending upon whether or not the last scan indicated an accessed or not accessed status. The table further contains a running total of the number of accesses for each SP-Vector which allows a rapid determination of which pages have been accessed the least. The least accessed pages may then be selected for swapping out of physical memory.

2 Claims, 2 Drawing Sheets

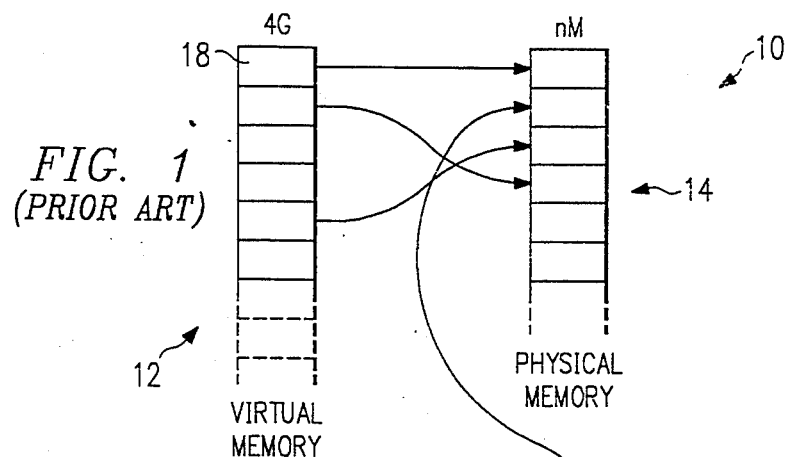
FIG. 1
(PRIOR ART)
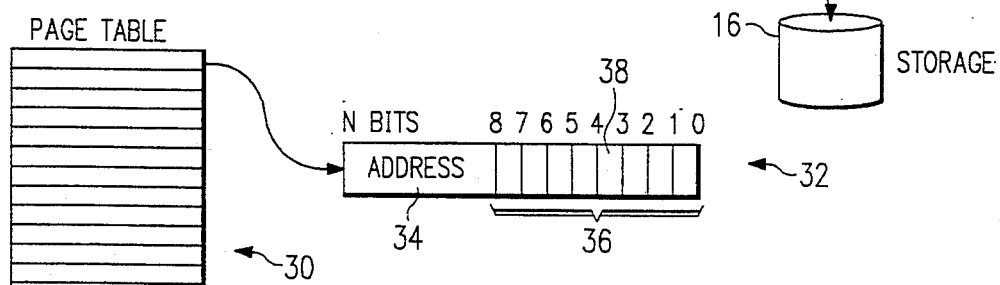
FIG. 2
(PRIOR ART)
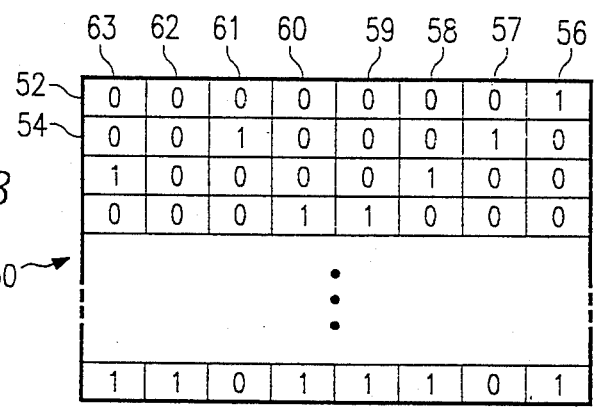
FIG. 3
FIG. 4

TABULATION OF MULTI-BIT VECTOR HISTORY

CROSS REFERENCE TO RELATED APPLICATIONS

This application is related in subject matter to the following applications filed concurrently herewith and assigned to a common assignee:

Application Ser. No. 07/872,731 filed by S. Parikh entitled Method and Apparatus for Increasing Efficiency of Ager; application Ser. No. 07/872,732 filed by S. Parikh entitled Multi-Bit Vector for Page Aging; application Ser. No. 07/872,935 filed by S. Parikh entitled Method and Apparatus for Efficient Processing of Page Table Entires; application Ser. No. 07/872,733 filed by S. Parikh entitled Method and Apparatus for Predetermining Pages for Swapping from Physical Memory.

The foregoing co-pending applications are incorporated herein by reference.

TECHNICAL FIELD OF THE INVENTION

This invention relates in general to memory management, and in particular to a method and apparatus for improving page aging utilizing a table to tabulate a history of page use as recorded in multi-bit vectors.

BACKGROUND OF THE INVENTION

In modern microprocessors, the concept of virtual memory is used in conjunction with the physical memory. Virtual memory allows a smaller amount of physical memory (which is important due to cost) to be used with large and/or multiple applications. This is possible due to the fact that only a relatively small portion of any particular application is required to be in physical memory at any one time. Therefore, in computer systems running several applications simultaneously, it is possible to place only the data and code that is needed for the currently running application in physical memory while unused data and code is either left in virtual memory or stored on a hard disk drive.

A paging based memory management uses the concept of pages, each of which typically comprise 4K (thousands of bytes) of memory address. The virtual memory causes the application to believe there is, for example, 4 G (gigabytes) of memory available (for a 32 bit addressing scheme), whereas in reality there is typically anywhere from less than 1 M (megabyte) on up of physical memory (RAM). Thus it is necessary to be able to "swap" pages from physical memory to another location (ie., a disk/secondary storage).

In order to allow swapping in paging based memory management (for example, the "INTEL" Corporation 386 and 486 microprocessors, hereinafter "i386/i486"), it is typical to provide a paging system which serves to map and locate each individual page. Mapping is done by creating and maintaining page tables which list the location of each page in a page table entry (PTE). Thus, when an application requires a specific page, that page may be located by scanning through a page table. The PTE contains the address of the page as well as an accessed/not accessed flag which indicates a most recent usage.

In order to attempt to maximize the efficiency of the swapping into and out of physical memory, operating systems are provided with an ager. The purpose of an ager is to swap the least recently used pages out of physical memory when space is needed. The pages that have not been recently used will first be designated for an "idle" list and then will be swapped out as necessary. Thus, if there are pages not being used, it is more efficient to place them in storage (ie., disk) rather than take up space that may be needed in physical memory. Therefore, the ager and the paging system work in combination to keep track of the location of a page and to keep only the pages that are actually needed in physical memory.

One key determinant of a base operating system's performance is the performance of the paging based memory management, since it can directly impact the rest of the system's performance in the dimensions of working set, response time, and capacity. Thus, it is imperative that the fundamental memory management be carefully designed. In modern microprocessors, support for paging memory management is present but limited.

The efficiency of paging memory management is directly impacted by: (1) the efficiency and effectiveness of the aging, (2) correct identification of the pages which no longer belong in the working set, and (3) length of the aging cycle. By shortening the aging cycle, there will typically be a proportionate decrease in the working set. For over-committed systems, it is imperative that the ager be sufficiently efficient, since the absence of such efficiency will allow the wrong pages to occupy physical memory.

In the paging based memory management architecture of some modern microprocessors such as the "i386/i486", there is a PTE corresponding to each page in memory, as previously described above. The page table entries reside in page tables. Each process has its own separate set of page tables and PTE's. Each time the contents of a page are accessed, an "accessed" flag in the PTE corresponding to that page is set by the base hardware. This flag tells the ager that the page has been accessed (or not accessed) since the last aging service or cycle through that page table. The ager clears the flag after scanning the PTE. Typically the ager must scan all the page tables of all processes in a system to complete one full aging cycle. Periodically the ager scans all the PTEs, checks the status of the bits, and takes the appropriate actions, which could include paging out the pages which were not accessed recently. In the "i386/i486" microprocessors, support for identification of the exact page access pattern including the exact order of access is limited to the "accessed/not accessed" bit in the PTE. In the base hardware, no page level time stamping is available which will tell the paging memory management sub-system the exact order of the page accesses.

It is very important that the time allocated to the ager be utilized carefully: (1) the ager should be efficient at its chosen task of identifying the next set of pages to be paged out, and (2) the ager should be accurate in identifying the pages which need to be paged out. Incorrect decisions in this regard can significantly increase erroneous page-outs, increase the physical memory requirement, and ultimately can reduce the competitiveness of the system. The central processing unit (CPU) time consumed by the ager comes at the expense of the other processes in the system and a complete aging cycle can take several CPU time slices. For efficient utilization of the resources (such as CPU time) consumed by the ager, it is important that the ager judiciously allocate these available resources to different processes.

In addition to the efficiency of the functioning of the ager, it is also important to facilitate a superior selection of the pages designated for an "idle list" which will be paged out next. Current systems utilize an approximation of a least recently used (LRU) method to swap a page out of memory. This method can often lead to incorrect decisions, especially for highly dynamic and over committed systems. As previously described above, once access flags corresponding to two physical pages are set, there is no way for the operating system to determine which page was accessed first. Additionally, once the accessed flags of two PTEs corresponding to two different pages are reset, there is no way for the operating system to determine which one was accessed last. Thus, it is entirely possible that the ager will select an incorrect page (ie., one that was most recently used) to be swapped out.

For example, while scanning PTEs, the ager may detect two PTEs with access flags reset. To the ager, this implies that after these flags were last reset, the pages were not accessed. It can designate both of these pages for the idle list (ie., a list of potential candidates to be paged out) and eventually page out both of them if they are not accessed soon enough. In other words, both pages are treated equally from the perspective of the ager. However, one page can be of a very high usage (eg., a page containing code of a high usage software) which happens to have had no access in the immediate past, while the other page could be a genuinely low usage page. However, the first page has a higher probability of being accessed in the future than the second page. Due to the limitations of the ager, it is possible that when a page needs to be paged out, the first page (ie., the high usage page) could be chosen, since from the limited perspective of the ager, both pages appear the same. Therefore, if the first page needs to be referenced again after being swapped out, a page fault will occur. A page fault typically causes a delay in processing time since the process being run must be halted while the page is located and swapped back into physical memory.

The accessed bit flag is set in a corresponding PTE whenever the page is accessed. The aging process scans the PTEs sequentially to identify the pages which have/have not been accessed and the pages not accessed are eventually designated for the idle list and may be paged out. The scanning process is inherently time consuming. Not all the PTEs in a page table need to be scanned, since only a sub-set of the pages corresponding to these PTEs will be present in physical memory. Typically, a large number of the PTEs may have to be scanned just to find an entry corresponding to a page that is present in physical memory. Essentially a very large number of entries may have to be scanned in order to locate the PTEs corresponding to the pages present in the physical memory.

Thus there is a need for a method and apparatus to more effectively manage memory in a microprocessor. In particular, a method and apparatus which achieves more efficient page aging in a paging based memory management is required.

SUMMARY OF THE INVENTION

The invention disclosed herein comprises a method and apparatus for utilizing multi-bit vector history for page aging in a tabulated format which substantially eliminates or reduces the problems of using standard aging and paging. The method and apparatus described herein allows a more convenient and readily available data in a paging based memory management system.

In accordance with one aspect of the present invention, a method of memory management in a computer system utilizing a page manager including an ager is provided. The page manager is of the type having page tables with page table entries therein for mapping and locating each page of a process. A bit vector containing a plurality of bits is established for recording the number of accesses to each page table entry in each page table in a last predetermined number of cycles. when it is necessary to make room for a new page in physical memory, the vectors are evaluated to determine which page(s) should be paged out first.

A repository is created for maintaining a plurality of the vectors. In addition, a table is created to assist in interpretation of the vectors.

The bit vectors may be established with a plurality of bits therein. The plurality of bits may comprise, for example, eight bits, sixteen bits, thirty-two bits, or etc. The table provides a summary of the current pattern of access, a pattern which will be created if the page is again accessed, a pattern which will exist if the page is not accessed, and a number reflecting the total number of current accesses. Thus, by utilizing the table, the ager may simply scan the table for the number of accesses and swap out corresponding pages reflected by the lowest number of current accesses.

It is a technical advantage of the present invention that a more detailed history of access to a page is maintained. Thus the ager will select the more appropriate pages to be swapped out when room is needed for physical memory.

BRIEF DESCRIPTION OF THE DRAWINGS

For a more complete understanding of the present invention and the advantages thereof, reference is now made to the Detailed Description in conjunction with the attached Drawings, in which:

FIG. 1 is a graphical representation of the interrelationships of virtual memory, physical memory and storage;

FIG. 2 is a page table and a page table entry in accordance with the prior art;

FIG. 3 is a bit vector repository in accordance with the present invention;

FIG. 4 is a table created for interpreting the page history of the vectors of the present invention;

DETAILED DESCRIPTION OF THE INVENTION

Figure 5:
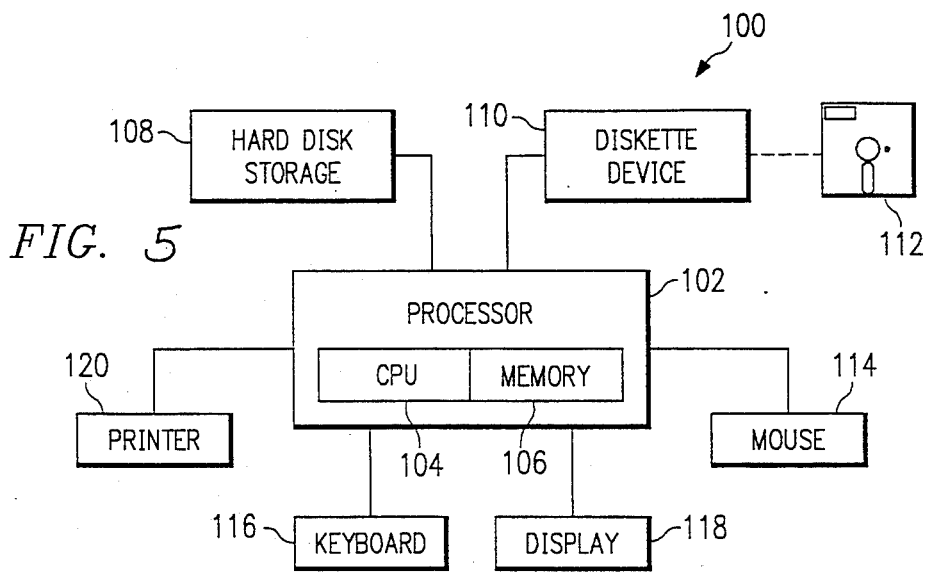
FIG. 5 is a schematic view of a data processing system in accordance with the present invention.

Referring first to FIG. 1, a graphical representation of a memory system is generally identified by the reference numeral 10. When a computer program is written, it is written with the understanding that there is more usable memory available for addressable use than actually physically exists. Typically, four gigabytes (G) of virtual (ie., not really existing) addressable memory 12 is provided. While the amount of physical memory (RAM) 14 varies from computer system to computer system, there is less physical memory 14 available than there is virtual memory 12. As shown in FIG. 1, the memory 14 has n M(megabytes) of memory, wherein n represents a variable number typically between 1 and 64. Thus, computer hardware may be provided with a storage device 16 such as, for example, a hard disk drive for use in conjunction with the physical memory 14.

As a process (ie., a computer program) is run on a computer system (see FIG. 5), a page (comprising 4K of code data) such as indicated by the reference numeral 18 may be transferred from virtual memory 12 to physical memory 14. There is no particular order in which pages are transferred from virtual memory 12 to physical memory 14, and, therefore, sequential pages in virtual memory 12 may not be sequential pages in physical memory 14.

Once the process that is running on the computer system has used the page, a different process may require physical space in the physical memory 14. If none is available, it is necessary for the page in physical memory 14 to be "swapped" from physical memory 14 to the storage device 16. Additionally, if a process requires a page which has been placed into the storage device 16, that page must be swapped from the storage device 16 into physical memory 14.

It is the job of a paging based memory management to map and locate pages between virtual memory 12, physical memory 14 and the storage device 16. Referring to FIG. 2, in "i386/i486" based microprocessors a paging based memory management typically uses a page table 30 which includes a plurality of page table entries 32. Each page table entry 32 comprises an address section 34 and a series of information bits or flags 36. The information flags 36 are used for a number of purposes such as, for example, to indicate whether or not the page is present in physical memory, whether the page is a read/write page, and etc. to include an accessed/not accessed flag, as identified by the reference numeral 38. The purpose of the flag 38 is to allow the paging based memory management to attempt to keep track of whether a page has or has not been recently used. The flag 38 is set by the base hardware ("i386/i486" chip) every time the page is accessed.

In conjunction with the paging based memory management, an ager is used to assist with the swapping between physical memory 14 and storage 16. One purpose of the ager is to scan the accessed/not accessed flags 38 and, when space is needed in physical memory 14, to swap the least recently used pages from physical memory 14 to the storage device 16. Due to the limited amount of information available to the ager from the single accessed/not accessed flag 38, it is possible that the ager will select the wrong page to be swapped from physical memory 14. This is possible due to the fact that once the flags 38 for different PTE's are set, the ager has no way of knowing which flag 38 was set most recently. Additionally, once the ager scans all the PTEs, the flags 38 are reset and thus, there is no way to determine which page was accessed last.

Referring next to FIGS. 3 and 4, one embodiment of the present invention is graphically illustrated. Referring first to FIG. 3, an SP-Vector repository is generally identified by the reference numeral 50. The repository 50 comprises a plurality of SP-Vectors (one SP-Vector for each physical page) such as are indicated by the reference numerals 52 and 54. Each SP-Vector 52, 54 comprises a plurality of bits (as shown herein for example only as 8 bits) indicated by the reference numerals 56, 57, 58, 59, 60, 61, 62 and 63. Although, as shown in FIG. 3, there are eight bits (flags) 56 through 63, there may be any number of bits, as desired. For example, a sixteen bit SP-Vector could be a concatenation of two eight bit vectors and each eight bit vector can be manipulated, as will be hereinafter described in greater detail. Obviously, there could be 24 bits, 32 bits and etc.

The SP-Vectors 52, 54 comprise 8 bits into which either a "1" or a "0" may be placed. For example, if the page corresponding to the SP-Vector 52 is accessed, a "1" will be placed in the right most bit, ie. in bit 56. The next time ager checks the PTE's to see if that page is accessed or not accessed, the "1" in bit 56 will move one bit to the left, ie. to bit 57. If the page was accessed since the last ager scan, another "1" will then be placed in the bit 56. If the page was not accessed, a "0" will be placed in the bit 56, and so on. In other words, a right shift occurs dropping off the left most bit. Thus there will be a history created for each page corresponding to each SP-Vector that spans the last eight times that ager has scanned the PTE's. Such a history provides more useful information to ager than is currently available in the prior art.

Referring next to FIG. 4, a data_Inter Table is generally identified by the reference numeral 80. The table 80 is created to provide one way to interpret the page history as recorded in the SP-Vectors (FIG. 3) and provides a quick way to update the SP-Vectors in the repository 50. The table 80 contains four columns of information: Access Pattern 82, Page Accessed 84, Page Not Accessed 86, and Total Accesses 88. The Access Pattern 82 is a listing of all possible combinations of SP-Vectors beginning with no accesses, ie., all zeros and ending with all accesses, ie., 8 ones. The Page Accessed 84 is a representation of what the SP-Vector in the Access Pattern 82 will become if the page represented thereby has been accessed since the last ager scan. The Page Not Accessed 86 is a representation of what the SP-Vector representing a page will become if the page has not been accessed since the last ager scan. The Total Accesses 88 comprises a numeric representation of the total number of accesses to the page represented by the SP-Vector in Access Pattern 82 for the last eight ager scans. Thus, the table 80 provides a rapid update capability for every possible Access Pattern 82, as the Page Accessed 84 and the Page Not Accessed 86 will provide the information for updating the actual accessed pattern of the appropriate SP-Vector regardless of what happens. Also, the Total Accesses 88 provides a current total of how many accesses the corresponding page has had without the necessity of counting the ones in each Access Pattern 82 or each SP-Vector. Therefore, a more informative reference is available to provide the least recently used pages for swapping as needed.

Referring next to FIG. 5, there is shown, in block diagram form, a data processing system generally identified by the reference numeral 100 according to the present invention. The system 100 includes a processor 102, which includes a central processing unit (CPU) 104 and a memory 106. Additional memory, in the form of a hard disk storage 108 and a diskette device 110, is connected to the processor 102. The diskette device 110 receives a diskette 112 which has computer program code recorded thereon that implements the present invention in the system 100. The system 100 includes user interface hardware, including a mouse 114 and a keyboard 116 for allowing user input to the processor 102 and a display 118 for presenting visual data to the user. The system 100 may also include a printer 120.

Figure 6:
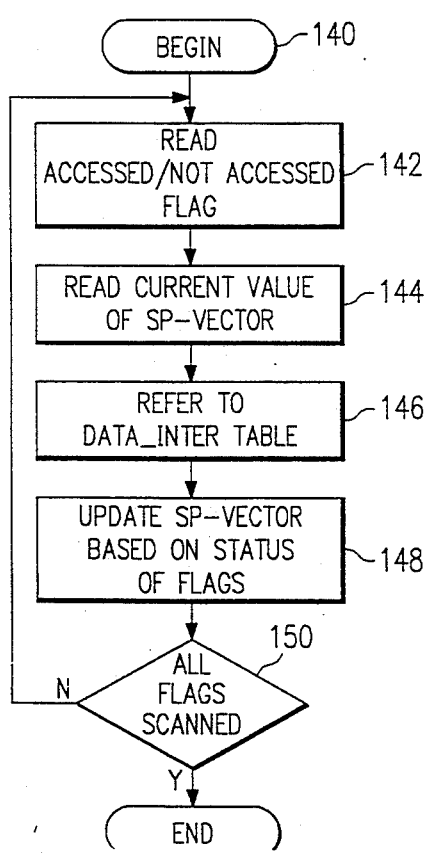
FIG. 6 is a flow chart illustrating the ager while scanning page table entries in accordance with the present invention.

Referring to FIG. 6, a flow diagram illustrating the present invention during the ager scanning of page table entries is shown. The ager begins at block 140 and proceeds to read the accessed/not accessed bit flag in each page table entry at block 142. The ager then reads the current value of the SP-Vector at block 144 corresponding to the page being checked. The ager will then refer to the Data_Inter Table at block 146 to obtain the correct update representation for the SP-Vector depending upon the status of the accessed/not accessed flag as determined at block 142. At block 148 the SP-Vector is updated based upon the status of the flags as determined in block 142 and by the correct update representation as found in the Data_Inter Table in block 146. The ager then determines whether or not all flags have been scanned at decision block 150. If the response to decision block 150 is no, the ager returns to block 142 to further read accessed/not accessed flags. If the response to decision block 150 is yes, the ager ends for that aging cycle.

Figure 7:
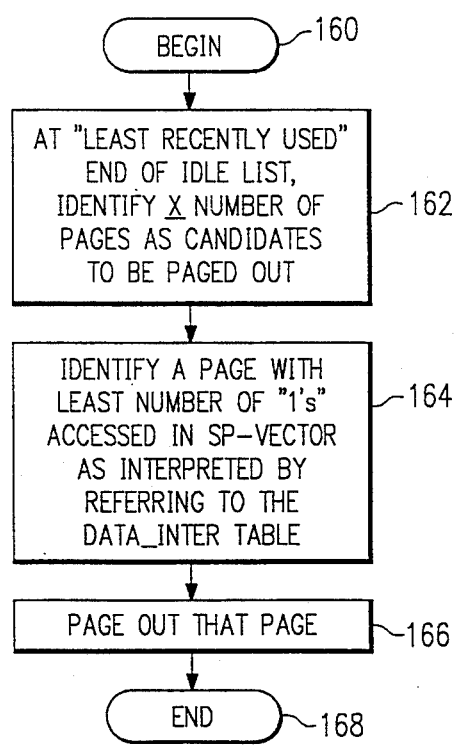
FIG. 7 is a flow chart illustrating actions of the present invention while identifying pages to be paged out.

Referring to FIG. 7, a flow diagram of the present invention while identifying pages to be paged out is illustrated. After beginning at block 160, "X" (a tunable parameter which may be preselected as desired) number of pages as candidates to be paged out are located on the least recently used end of the idle list. At block 164 pages with the least number of "1"s in the SP-Vector as interpreted by referring to the Data_Inter Table Total Accesses 88 (see FIG. 4) are identified. At block 166 that page (or pages) is then paged out followed by ending at block 168.

Thus, by utilizing the present invention, a more efficient memory management is attained. Rather than relying on the single accessed/not accessed bit flag in each page table entry, a multi-bit vector is created to maintain a history of the usage of each page. Therefore, a more reliable status of each page is available for review prior to swapping a page from physical memory to storage and the Data_Inter Table simplifies interpretation of the history data in the bit vectors.

Although the present invention has been particularly shown and described with reference to a preferred embodiment, it will be understood by those skilled in the art that various changes in form and detail may be made without departing from the spirit and the scope of the invention.

What I claim is:

1. An improved method of memory management in a computer system utilizing a page manager including an ager, the page manager being of a type having page tables and page table entries therein for mapping and locating each page of a process and further including bit vectors for recording a history of a number of accesses in a plurality of aging cycles to each page table entry in each page table, the improvement comprising the steps of:

creating a data table to facilitate interpretation of the bit vectors, comprising the steps of:

creating a tabulation of all possible access patterns;

creating a tabulation of how said access patterns will appear following an additional accessed recording; and creating a tabulation of how said access patterns will appear following an additional not accessed recording; and totalling a number of said accessed recordings for each of said access patterns; and utilizing said data table to quickly update the bit vectors with said number of said accessed recordings, wherein said number of said accessed recordings determines which page is least recently used and thus should be swapped from physical memory when space therein is required for another page.

2. A device for assisting a memory management in a computer system utilizing a page manager including an ager, the page manager being of the type having page tables and page table entries therein for mapping and locating each page of a process, comprising:

a bit vector comprising a plurality of bits for recording an accessed history in a plurality of aging cycles of each page of the system;

a data table for compiling said accessed history as recorded in said vector, said data table comprising:

a tabulation of all possible access patterns of said bit vector;

a tabulation of how said access patterns will appear following an additional accessed recording;

a tabulation of how said access patterns will appear following an additional not accessed recording; and a total of said accessed recordings for each of said access patterns; and means for utilizing said data table to quickly update said bit vector with said total of said accessed recordings, wherein said total of said accessed recordings determines which page is least recently used and thus should be swapped from physical memory when space therein is required for another page.

* * * * *